United States Patent
Ramachandran

(10) Patent No.: US 10,587,922 B2
(45) Date of Patent: Mar. 10, 2020

(54) SYSTEM AND METHOD FOR PROVIDING VIEWERSHIP MEASUREMENT OF A PARTICULAR LOCATION FOR DIGITAL-OUT-OF-HOME MEDIA NETWORKS

(71) Applicant: MOVING WALLS SDN BHD, Kuala Lumpur (MY)

(72) Inventor: Srikanth Ramachandran, Kuala Lumpur (MY)

(73) Assignee: MOVING WALLS SDN BHD, Kuala Lumpur (MY)

( * ) Notice: Subject to any disclaimer, the term of this patent is extended or adjusted under 35 U.S.C. 154(b) by 0 days.

(21) Appl. No.: 16/077,007

(22) PCT Filed: Feb. 13, 2017

(86) PCT No.: PCT/MY2017/000005
§ 371 (c)(1),
(2) Date: Aug. 9, 2018

(87) PCT Pub. No.: WO2017/138808
PCT Pub. Date: Aug. 17, 2017

(65) Prior Publication Data
US 2019/0037275 A1    Jan. 31, 2019

(30) Foreign Application Priority Data
Feb. 12, 2016   (MY) .......................... PI 2016700517

(51) Int. Cl.
*H04N 21/466* (2011.01)
*G06N 5/00* (2006.01)
(Continued)

(52) U.S. Cl.
CPC ......... *H04N 21/4667* (2013.01); *G06N 5/003* (2013.01); *G06N 20/00* (2019.01);
(Continued)

(58) Field of Classification Search
None
See application file for complete search history.

(56) References Cited

U.S. PATENT DOCUMENTS

| | | | |
|---|---|---|---|
| 2008/0004953 A1* | 1/2008 | Ma .......................... | G06Q 30/02 705/14.41 |
| 2009/0158309 A1 | 1/2009 | Moon et al. | |

(Continued)

OTHER PUBLICATIONS

Dokyun Lee et al. "Advertising Content on Consumer Engagement on Social Media: Evidence from Facebook" Stanford Graduate School of Business, working paper No. 3087, Jul. 2016.

*Primary Examiner* — Nathan J Flynn
*Assistant Examiner* — Christen A Kurien
(74) *Attorney, Agent, or Firm* — Kaplan Breyer Schwarz, LLP

(57) ABSTRACT

A system and method for providing viewership measurement for a digital media asset hosted at a particular location has been disclosed. The system employs a machine learning process to receive classified sensor data corresponding to viewership of a digital media asset at a particular location from a plurality of sources to generate trained data. The trained data is utilized by the system along with limited sensor data to provide viewership measurement of a target digital media asset whose audience is unknown.

20 Claims, 3 Drawing Sheets

(51) Int. Cl.
  *H04N 21/414*  (2011.01)
  *H04N 21/442*  (2011.01)
  *H04N 21/81*   (2011.01)
  *H04N 21/45*   (2011.01)
  *G06N 20/00*   (2019.01)

(52) U.S. Cl.
  CPC . *H04N 21/41415* (2013.01); *H04N 21/44218* (2013.01); *H04N 21/4524* (2013.01); *H04N 21/4665* (2013.01); *H04N 21/812* (2013.01)

(56) References Cited

U.S. PATENT DOCUMENTS

| | | |
|---|---|---|
| 2009/0217315 A1 | 8/2009 | Malik et al. |
| 2013/0046577 A1* | 2/2013 | Marci ............... G06Q 10/10 705/7.29 |
| 2017/0178181 A1* | 6/2017 | Liu ............... G06Q 30/0246 |

* cited by examiner

SYSTEM AND METHOD FOR PROVIDING VIEWERSHIP MEASUREMENT OF A PARTICULAR LOCATION FOR DIGITAL-OUT-OF-HOME MEDIA NETWORKS

FIELD OF THE INVENTION

The present invention relates to Digital Out-of-Home (DOOH) advertising media networks. Particularly, the present invention relates to a system and a method for gathering and analysing viewership data for DOOH media networks. The analysed viewership data is used for generating recommendations for digital media asset owners for selecting a location and corresponding promotional content for display on DOOH media.

BACKGROUND OF THE INVENTION

Digital out-of-Home (DOOH) advertising is increasingly becoming popular compared to conventional techniques of branding such as television adverts, radio adverts, billboards and signages. DOOH is a form of advertising which involves displaying digital promotional content on digital media assets such as LED screens at outdoor locations for targeting audiences in public places such as popular streets, shopping malls, cafes, shops, transportation hubs, petrol stations or the like.

Typically, the LED screens or digital media assets as they are commonly known are located at various outdoor locations where they could catch the eye of on-the-go consumers while they are outside their home or offices. These digital media assets are hired by companies or individuals for advertising their products and/or services.

The selection of a location and corresponding promotional content for hosting the media asset is decided by the company or individual based on their observation of visibility and popularity of a particular location. However, many a times the selected location misses to capture the target audience and thereby fails to reach its advertising or branding objective. As a result, the amount of money and creative effort involved in designing and hosting the digital content on these media assets goes futile.

There is therefore felt a need for a system that would enable the digital media asset owners to make informed decisions when selecting a particular digital content or media asset location while preparing the branding strategy of their product or service; such that an intended audience is captured with targeted digital media content.

SUMMARY OF THE INVENTION

Embodiments of the present invention provide a system and method for providing viewership measurement for digital media assets hosted at a particular location.

The proposed system comprises a plurality of sensors which are dispersed in a particular geographical location that hosts a digital media asset to fetch information characterizing an audience of the digital media asset and store the fetched information in a repository. The system further includes a prediction generation unit which uses a processor to categorize and consolidate the fetched information from each of the sensors and generate viewership metrics using the consolidated information. The prediction generation unit further applies at least one machine learning technique on the viewership metrics to generate sampling data which is further iteratively regenerated to generate trained data. In addition, the learning is further used to predict audience information of a location which has a similar pattern and for a location which is nearby.

A viewership classifier is also provided to employ the trained data to compute and provide viewership measurement for a new digital media asset at a discrete geographical location with limited sensors. The viewership classifier uses the trained data along with information fetched from at least one sensor associated with the new digital media asset to characterize unknown audience of the new digital media asset.

Typically, the sensors include eye trackers, Bluetooth Smart based sensor, WiFi based sensor, traffic sensor, weather sensor, social media sensor, telco sensor and combinations thereof.

The proposed system also includes a data normalizer to validate the fetched information using linear modelling techniques. The data generated is validated on a day to day basis for continuous improvement. As time moves, the system is capable of learning audience pattern and is expected to be near accurate upon reaching a duration of 9-12 months of monitoring.

Further, the prediction generation unit classifies the fetched sensor data into categories including demographics, user migration, user interests and dwell time, wherein demographics includes gender, age group, language, migration, income details, race and religion and ethnicity. The prediction generation unit then calculates a weighted average of the information fetched from each of the sensors and applies isotonic regression technique for consolidation of categorized information from each of the sensors.

Still further, the viewership metrics include reach %, frequency, opportunity to see, OTS and gross rating point, GRP.

In addition, the prediction generation unit generates sampling data in the form of a plurality of snapshots predicted for the particular geographical location for discrete time intervals using decision tree modelling technique, wherein each snapshot corresponds to a discrete time interval for that location.

Furthermore, the prediction generation unit regenerates the sampling data until the regenerated sampling data matches with actual numbers computed in the categorized information.

Additionally, the viewership classifier characterizes the unknown audience by providing viewership measurement in a format including reports and graphs. The viewership measurement data generated by the viewership classifier includes audience characterizing content including reach %, frequency, opportunity to see (OTS) and gross rating point (GRP).

The learning is further used to generate audience information with demography, reach %, frequency should 2 or more locations are grouped together to form an audience zone. By utilizing the methodologies, algorithms are designed in a way that prediction can be done for a look-alike location. The system has capability to validate data and find common audience in grouped location.

In accordance with the present invention there is also provided a method for providing viewership measurement for a digital media asset hosted at a particular location, the method comprising the following steps: fetching information characterizing an audience of the digital media asset using a plurality of sensors dispersed in a particular geographical location hosting the digital media asset; classifying the fetched information into categories for each of the sensors and consolidating the categorized information; generating viewership metrics using the consolidated information; applying at least one machine learning technique on the viewership metrics to generate sampling data; iteratively regenerating the sampling data to generate trained data; fetching information associated with a new digital media asset from at least one sensor; and using the trained data along with information fetched from at least one sensor to measure viewership for the new digital media asset.

Typically, the step of classifying the fetched information into categories includes: normalizing the fetched information by using linear modelling techniques; classifying the fetched sensor data into categories including demographics, user migration, user interests and dwell time, wherein demographics includes gender, age group, language, migration, income details, race and religion and ethnicity; calculating a weighted average of the information fetched from each of the sensors; and applying isotonic regression technique on the weighted average of information fetched from each of the sensors to consolidate the information fetched from all the sensors.

Further, the step generating viewership metrics using the consolidated information includes calculating viewership measurements including reach %, frequency, opportunity to see, OTS and gross rating point, GRP associated with the geographical location.

Still further, the step of applying at least machine learning technique on the viewership metrics to generate sampling data includes generating sampling data in the form of a plurality of snapshots predicted for the particular geographical location for discrete time intervals using decision tree modelling technique, wherein each snapshot corresponds to a discrete time interval for that location.

In addition, the step of iteratively regenerating the sampling data to generate trained data includes refining the sampling data until the regenerated sampling data matches with actual numbers computed in the categorized information.

Furthermore, the step of using the trained data along with information fetched from at least one sensor to measure viewership for the new digital media asset includes providing the measured viewership data as measurements including reach %, frequency, opportunity to see, OTS and gross rating point, GRP and representing the measurements in the form of reports and/or graphs.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DETAILED DESCRIPTION

The embodiment herein and the various features and advantageous details thereof are explained with reference to the non-limiting embodiment in the following description. Descriptions of well-known components and processing techniques are omitted so as to not unnecessarily obscure the embodiments herein. The examples used herein are intended merely to facilitate an understanding of ways in which the embodiment herein may be practiced and to further enable those of skill in the art to practice the embodiment herein. Accordingly, the description should not be construed as limiting the scope of the embodiment herein.

The description hereinafter, of the specific embodiment will so fully reveal the general nature of the embodiments herein that others can, by applying current knowledge, readily modify or adapt or perform both for various applications such specific embodiment without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Various terms as used herein are defined below. To the extent a term used in a claim is not defined below, it should be given the broadest definition persons in the pertinent art have given that term as reflected in printed publications and issued patents at the time of filing.

The dearth of systems for providing digital asset owners with viewership measurement for an unknown audience of a digital media asset, hosted at a location which has limited sensors, led the present invention to envisage a viewership prediction system.

Figure 1:
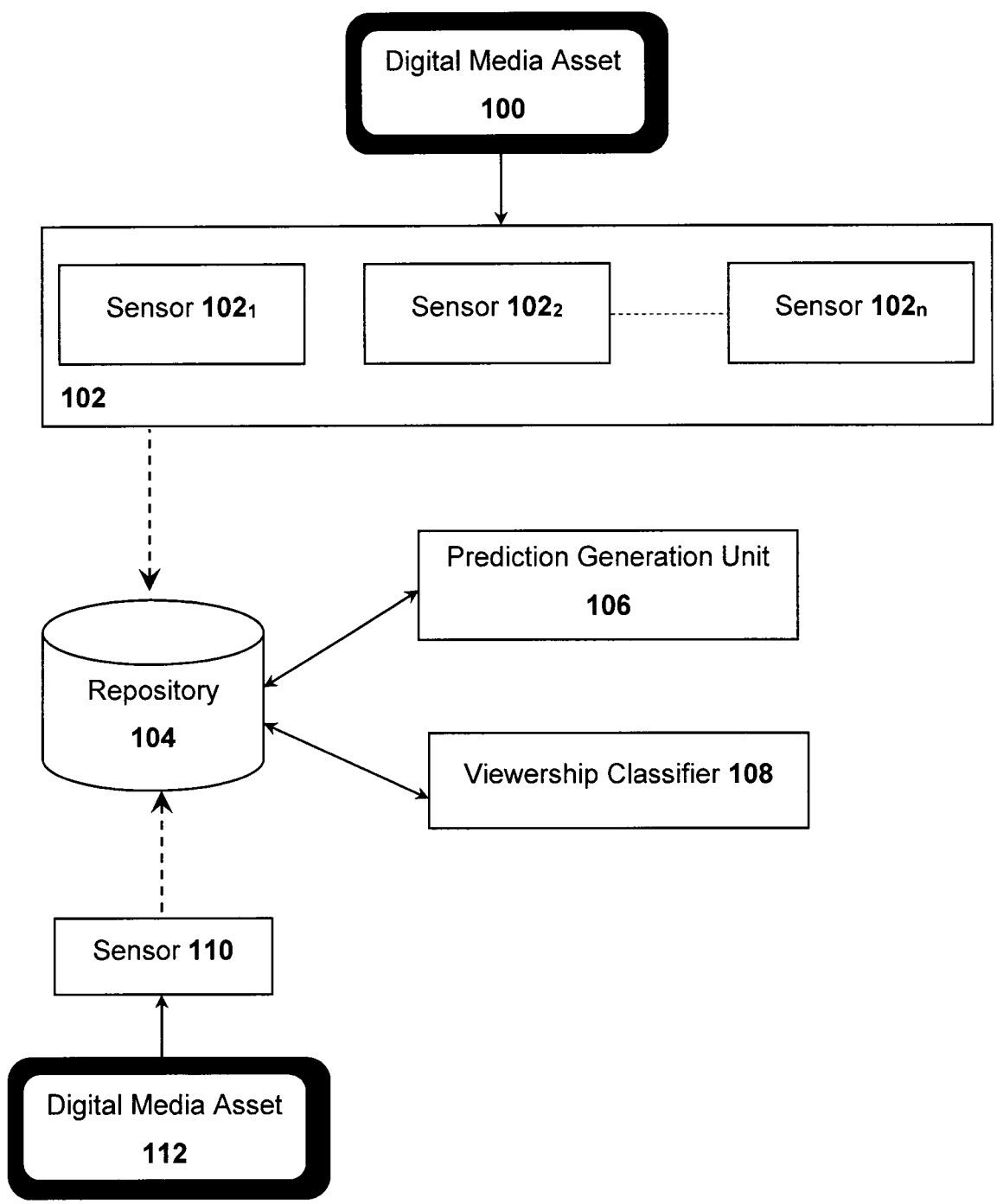
FIG. 1 is a block diagram showing the components of the system for providing viewership measurement for a digital media asset hosted at a particular location in accordance with the present invention.

Referring to the accompanying drawings, FIG. 1 presents a schematic of the system for viewership measurement for a digital media asset hosted at a particular location.

Figure 2:
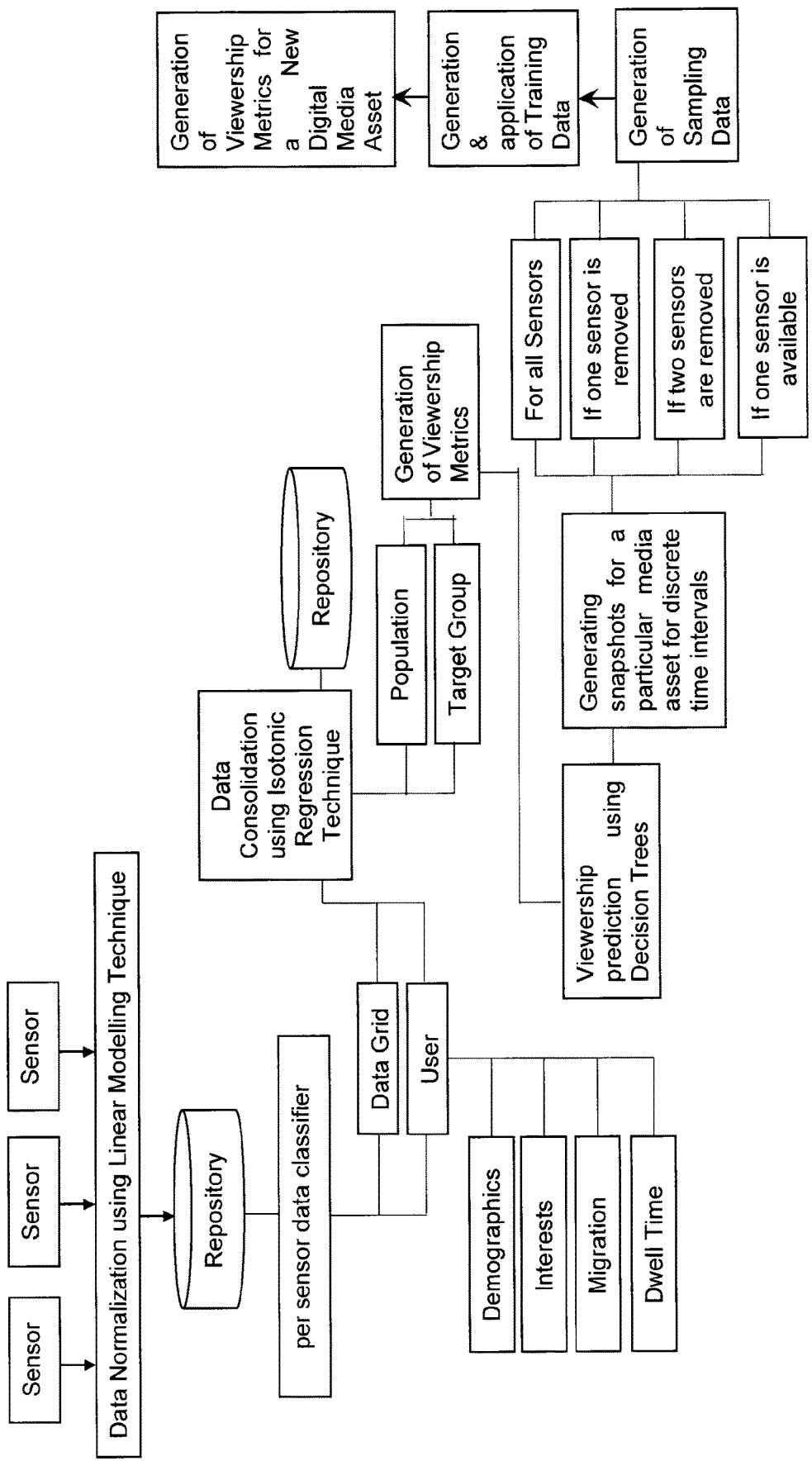
FIG. 2 is a process flow diagram showing stages involved in providing viewership measurement for a digital media asset hosted at a particular location in accordance with the present invention.
Figure 3:
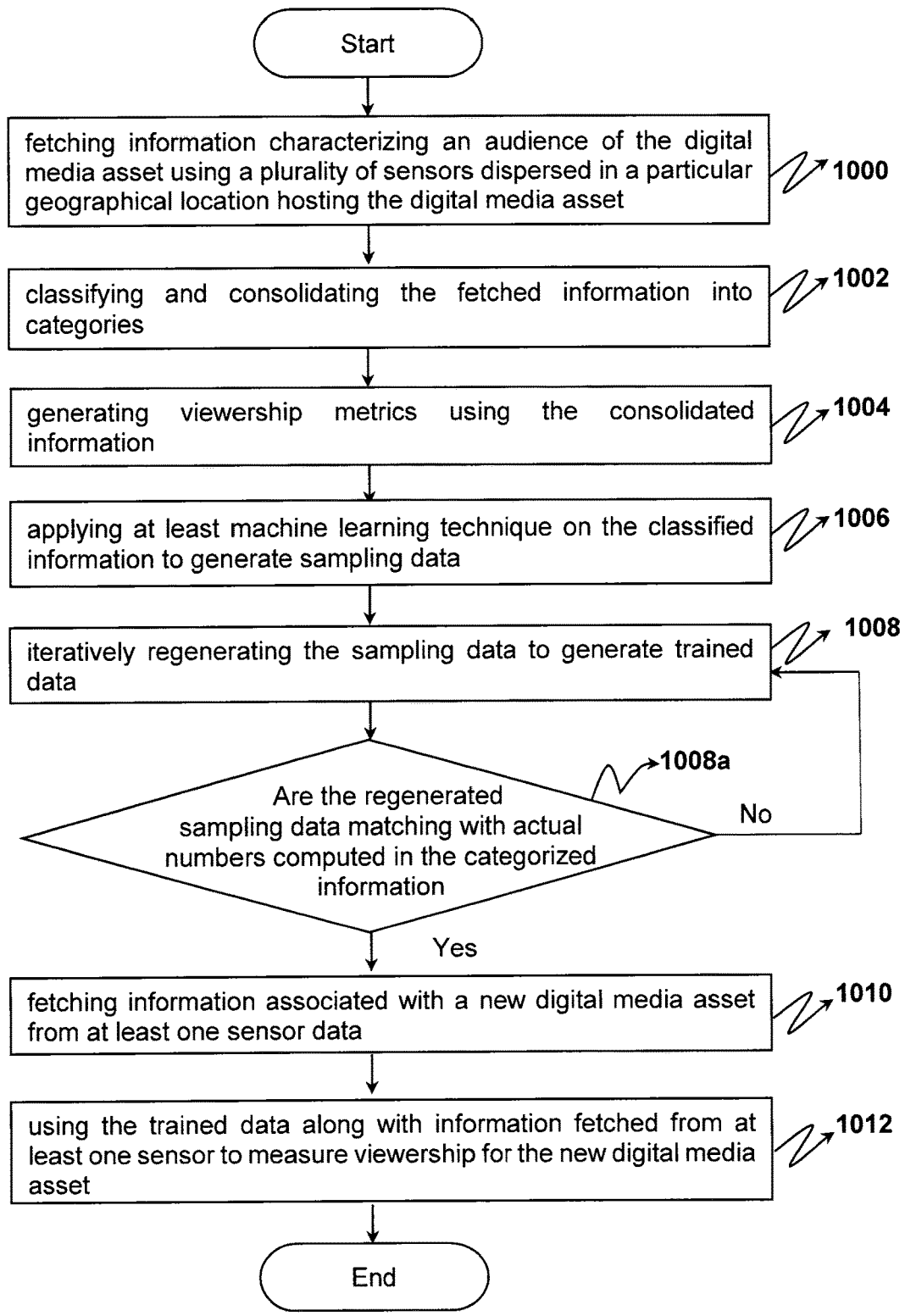
FIG. 3 is a flowchart showing the steps involved in the method for providing viewership measurement for a digital media asset hosted at a particular location in accordance with the present invention.

FIG. 2 is a data flow diagram showing the various analytics involved in providing viewership measurement for a digital media asset. The description hereinafter will explain the various analytics involved in the present invention in view of FIGS. 1 and 2.

The system comprises a plurality of sensors ($102_1$ to $102_n$), collectively represented by reference numeral (102), which are dispersed in a particular geographical location that hosts a digital media asset (100). The sensors (102) fetch information characterizing an audience of the digital media asset (100) and the fetched information is normalized before storing it in a repository (104).

The sensors (102) include eye trackers, Bluetooth Smart based sensor, WiFi based sensor, traffic sensor, weather sensor, social media sensor, telco sensor and combinations thereof. The sensors (102) may be placed inside the digital media asset (100) or in the vicinity of the digital media asset (100) to capture information on viewership of the digital media asset (100). The sensors (102) can collect the information characterizing the audience of the digital media asset (100) by streaming information from sensors (102) on a continuous basis and sending the streamed data to a repository (104) on a server. The eye tracker is one such sensor which continuously sends streaming data to the repository (104). The information from the sensors (102) is streamed using wireless technology, which is a known technology for streaming data; hence description of the technique used to stream information from the sensors (102) to the repository (104) is omitted.

Alternatively, the information characterizing the audience can be collected by manually fetching the information by using a query. The query is used to extract the data from the source. The query results are further analysed for specific analytical insights and interpretations. Social media techniques such as tweets, instagram messages, flickr posts are all examples of manually extracted information using queries.

The sensors (102) also facilitate in capturing demographic details of the audience using both the streaming and manual query sources. Demography covers various personas that asset owners require to know in order to determine the target audience for their promotional content or adverts. Demographic data includes gender, age, language, migration, income, race, religion, and ethnicity related details of the audience.

The system includes a data normalizer (not show in the figures) for normalizing the information fetched from the sensors. The information fetched from the sensors is in the form of time-series data and hence it needs to be validated to check whether sufficient volume of information is fetched from the sensors (102) and whether the information represents valid data sets. The data normalizer carries out data normalization using linear modelling techniques.

The system further includes a prediction generation unit (106) which incorporates a processor for analyzing the sensor data. The prediction generation unit (106) fetches the normalized sensor data from the repository (104) and classifies the fetched information from each sensor into categories such as demographics, interests, migration and dwell time. The prediction generation unit (106) then uses the classified data and applies isotonic regression technique on it to consolidate the classified sensor data from each of the sensors. The prediction generation unit (106) then calculates viewership metrics including reach %, frequency, Opportunity to See (OTS) and Gross Rating Point (GRP) for the digital media asset (100), which are calculated as follows:

Reach % is calculated as Viewership divided by Total Audience reported, in percentage OTS is calculated as (Total Audience−Total Viewership)

GRP is calculated as percentage of Viewership (calculated as Frequency) multiplied by Reach %

Frequency is the number of times the audience has been exposed to the campaign/digital promotional content For generating the viewership metrics the prediction generation unit (106) has to consolidate data from all the sensors (102). The prediction generation unit (106) consolidates the data by calculating a weighted average of the categorized/classified information from each of the sensors and applying isotonic regression on the consolidated information. Accordingly, weights are assigned to each of the sensors (102) based on the volume of the consolidated information. This facilitates in establishing a percentage impact of the specific sensor data on the overall audience. Hence, a weighted average of Eyeball, WiFi/BLE, Social Media, Telco, Weather and Traffic is calculated and used to compute the viewership metrics The prediction generation unit (106) then applies at least one machine learning technique on the calculated viewership metrics to generate sampling data. The machine learning technique used includes decision trees. The sampling data is generated in the form of a plurality of snapshots predicted for the particular geographical location and/or digital media asset for discrete time intervals, wherein each snapshot corresponds to a discrete time interval for that location. The prediction generation unit (106) iteratively regenerates the sampling data in order to reduce its dependency on the sensors (102). The sampling data is regenerated for various permutations and combinations including generation of snapshot from viewership metrics from all sensors, generation of snapshot from viewership metrics if one sensor is removed, generation of snapshot from viewership metrics if two sensors are removed and generation of snapshot from viewership metrics if only one sensor is available. The sampling data is regenerated until it matches with actual numbers computed in the classified information. Once the sampling data is matched it is then stored as trained data in the repository (104).

A viewership classifier (108) is then employed by the system to use the trained data to measure viewership of a new digital media asset (112) which is hosted at a discrete location and whose audience is unknown. The audience is unknown because the new location and the new digital media asset (112) have none or limited sensors available for characterizing the audience of that digital media asset (112).

Hence to characterize the unknown audience for the new digital media asset (112), information is collected from a sensor (110) dispersed at the new digital media asset (112). The viewership classifier (108) then using a processor incorporated therein uses the trained data along with information fetched from at least one sensor (110) associated with the new digital media asset (112) to characterize unknown audience of the new digital media asset (112). The viewership classifier (108) characterizes the unknown audience by providing viewership metrics in a format including reports and graphs, wherein the reports and graphs include audience characterizing content which are reach %, frequency, GRP and OTS.

In accordance with this invention, once the training data is generated it is validated and authenticated by varying various parameters and carrying out data simulation based on the varying parameters for the new location and the new digital media asset (112). As the training data is generated using maximum sensors using machine learning techniques for a known location its use as input for the classifier (108) enables prediction or viewership measurement to be carried out for an unknown location.

Another embodiment of the present invention discloses a method for providing viewership measurement for a digital media asset hosted at a particular location. The method comprises the following steps as seen in FIG. 2: fetching information characterizing an audience of the digital media asset using a plurality of sensors dispersed in a particular geographical location hosting the digital media asset, (1000); classifying the fetched information into categories for each of the sensors and consolidating the categorized information, (1002); generating viewership metrics using the consolidated information, (1004); applying at least one machine learning technique on the viewership metrics to generate sampling data, (1006); iteratively regenerating the sampling data to generate trained data, (1008); fetching information associated with a new digital media asset from at least one sensor, (1010); and using the trained data along with information fetched from at least one sensor to measure viewership for the new digital media asset, (1012).

Typically, the step of classifying the fetched information into categories includes: normalizing the fetched information by using linear modelling techniques; classifying the fetched sensor data into categories including demographics, user migration, user interests and dwell time, wherein demographics includes gender, age group, language, migration, income details, race and religion and ethnicity; calculating a weighted average of the information fetched from each of the sensors; and applying isotonic regression technique on the weighted average of information fetched from each of the sensors to consolidate the information fetched from all the sensors.

Further, the step generating viewership metrics using the consolidated information includes calculating viewership measurements including reach %, frequency, opportunity to see, OTS and gross rating point, GRP associated with the geographical location.

Still further, the step of applying at least machine learning technique on the viewership metrics to generate sampling data includes generating sampling data in the form of a plurality of snapshots predicted for the particular geographical location for discrete time intervals using decision tree modelling technique, wherein each snapshot corresponds to a discrete time interval for that location.

In addition, the step of iteratively regenerating the sampling data to generate trained data includes refining the sampling data until the regenerated sampling data matches with actual numbers computed in the categorized information, (1008a).

Furthermore, the step of using the trained data along with information fetched from at least one sensor to measure viewership for the new digital media asset includes providing the measured viewership data as measurements including reach %, frequency, opportunity to see, OTS and gross rating point, GRP and representing the measurements in the form of reports and/or graphs.

Thus, the present invention provides viewership prediction which will equip out of home digital media asset owners with intelligence and information on where and what time to advertise or display their digital promotional content on the digital media assets. The present invention also provides digital media asset owners with the information on how many people and what category of people will view the digital promotional content and at what time of the day.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A system for providing viewership measurement for a first digital media asset hosted at a particular location, said system comprising:
   at least three sensors dispersed in a particular geographical location hosting a digital media asset to fetch information characterizing an audience of the digital media asset and store the fetched information in a repository;
   a processor comprising a prediction generation unit to categorize and consolidate the fetched information from each of the sensors and generate viewership metrics using the consolidated information, the prediction generation unit further applies at least one machine learning technique on the viewership metrics to generate sampling data which is further iteratively regenerated to generate trained data; and
   the processor comprising a viewership classifier to employ the trained data to compute and provide viewership measurement for a second digital media asset at a discrete geographical location, said second digital media asset having fewer sensors than the first digital media asset, wherein the viewership classifier uses the trained data along with information fetched from at least one of the sensors associated with the second digital media asset to characterize unknown audience of the second digital media asset
      whereby the prediction generation unit iteratively regenerates the sampling data to reduce the dependency of sensors of the second digital media asset such that fewer sensors are required.

2. The system as claimed in claim 1, wherein the at least three sensors include eye trackers, Bluetooth Smart based sensor, WiFi based sensor, traffic sensor, weather sensor, social media sensor, telco sensor and combinations thereof.

3. The system as claimed in claim 1, wherein the system includes a data normalizer to validate the fetched information using linear modelling techniques.

4. The system as claimed in claim 1, wherein the prediction generation unit classifies the fetched sensor data into categories including demographics, user migration, user interests and dwell time, wherein demographics includes gender, age group, language, migration, income details, race and religion and ethnicity.

5. The system as claimed in claim 1, wherein the prediction generation unit calculates a weighted average of the information fetched from each of the sensors and applies isotonic regression technique for consolidation of categorized information from each of the sensors.

6. The system as claimed in claim 1, wherein viewership metrics include reach %, frequency, opportunity to see, OTS and gross rating point, GRP.

7. The system as claimed in claim 1, wherein the prediction generation unit generates sampling data in the form of a plurality of snapshots predicted for the particular geographical location for discrete time intervals using decision tree modelling technique, wherein each snapshot corresponds to a discrete time interval for that location.

8. The system as claimed in claim 1, wherein the prediction generation unit regenerates the sampling data until the regenerated sampling data matches with actual numbers computed in the categorized information.

9. The system as claimed in claim 1, wherein the viewership classifier characterizes the unknown audience by providing viewership measurement in a format including reports and graphs.

10. The system as claimed in claim 1, wherein the viewership measurement data generated by the viewership classifier includes audience characterizing content including reach %, frequency, opportunity to see, OTS and gross rating point, GRP.

11. A method for providing viewership measurement for a first digital media asset hosted at a particular location, the method comprising the following steps:
   a. fetching information characterizing an audience of the digital media asset using at least three sensors dispersed in a particular geographical location hosting the digital media asset;
   b. classifying the fetched information into categories for each of the sensors and consolidating the categorized information;
   c. generating viewership metrics using the consolidated information;

d. applying at least one machine learning technique on the viewership metrics to generate sampling data;
e. iteratively regenerating the sampling data to generate trained data;
f. fetching information from a second digital media asset, said second digital media asset having fewer sensors than the first digital media asset; and
g. using the trained data along with information fetched from the sensors on the second digital media asset to measure viewership for the new digital media assets; whereby the step of iteratively regenerating the sampling data reduces the dependency of sensors of the second digital media asset such that fewer sensors are required.

12. The method as claimed in claim 11, wherein the step of classifying the fetched information into categories includes:
a. normalizing the fetched information by using linear modelling techniques;
b. classifying the fetched sensor data into categories including demographics, user migration, user interests and dwell time, wherein demographics includes gender, age group, language, migration, income details, race and religion and ethnicity
c. calculating a weighted average of the information fetched from each of the sensors; and
d. applying isotonic regression technique on the weighted average of information fetched from each of the sensors to consolidate the information fetched from all the sensors.

13. The method as claimed in claim 11, wherein the step generating viewership metrics using the consolidated information includes calculating viewership measurements including reach %, frequency, opportunity to see, OTS and gross rating point, GRP associated with the geographical location.

14. The method as claimed in claim 11, wherein the step of applying at least machine learning technique on the viewership metrics to generate sampling data includes generating sampling data in the form of a plurality of snapshots predicted for the particular geographical location for discrete time intervals using decision tree modelling technique, wherein each snapshot corresponds to a discrete time interval for that location.

15. The method as claimed in claim 11, wherein the step of iteratively regenerating the sampling data to generate trained data includes refining the sampling data until the regenerated sampling data matches with actual numbers computed in the categorized information.

16. The method as claimed in claim 11, wherein the step of using the trained data along with information fetched from at least one sensor to measure viewership for the new digital media asset includes providing the measured viewership data as measurements including reach %, frequency, opportunity to see, OTS and gross rating point, GRP and representing the measurements in the form of reports and/or graphs.

17. The system as claimed in claim 1, wherein the second digital media asset has only one sensor.

18. The system as claimed in claim 1, wherein the second digital media asset has only two sensors.

19. The system as claimed in claim 11, wherein the second digital media asset has only one sensor.

20. The system as claimed in claim 11, wherein the second digital media asset has only two sensors.

* * * * *